United States Patent
Dempsey et al.

(10) Patent No.: US 10,210,995 B2
(45) Date of Patent: Feb. 19, 2019

(54) METHOD FOR PRODUCING A FILM COMPRISING THREE-DIMENSIONAL MAGNETIC MICROSTRUCTURES

(71) Applicants: Centre National de la Recherche Scientifique, Paris (FR); Universite Joseph Fourier-Grenoble 1, Saint Martin d'Hères (FR)

(72) Inventors: Nora Dempsey, Grenoble (FR); Frédéric Dumas-Bouchiat, Feytiat (FR); Luiz Fernando Zanini, Paris (FR); Dominique Givord, Grenoble (FR)

(73) Assignees: Centre National de la Recherche Scientifique, Paris (FR); Universite Joseph Fourier-Grenoble 1, Saint Martin d'Hères (FR)

(*) Notice: Subject to any disclaimer, the term of this patent is extended or adjusted under 35 U.S.C. 154(b) by 971 days.

(21) Appl. No.: 14/403,312

(22) PCT Filed: May 22, 2013

(86) PCT No.: PCT/EP2013/060540
§ 371 (c)(1),
(2) Date: Apr. 6, 2015

(87) PCT Pub. No.: WO2013/174881
PCT Pub. Date: Nov. 28, 2013

(65) Prior Publication Data
US 2015/0235763 A1    Aug. 20, 2015

Related U.S. Application Data

(60) Provisional application No. 61/650,398, filed on May 22, 2012.

(30) Foreign Application Priority Data

May 22, 2012 (FR) .................................. 12 54667

(51) Int. Cl.
*H01F 41/02* (2006.01)
*B29D 23/00* (2006.01)
(Continued)

(52) U.S. Cl.
CPC ....... *H01F 41/0266* (2013.01); *B29C 39/003* (2013.01); *B29C 51/002* (2013.01);
(Continued)

(58) Field of Classification Search
CPC ..... B29D 7/01; B29C 39/003; H01F 41/0266; H01F 41/005
See application file for complete search history.

(56) References Cited

U.S. PATENT DOCUMENTS

| 4,153,008 A | * | 5/1979 | Marino | .................. B01D 46/22 118/634 |
| 5,336,558 A | * | 8/1994 | Debe | ...................... C23C 14/12 428/323 |

(Continued)

FOREIGN PATENT DOCUMENTS

| EP | 0756272 | 1/1997 |
| JP | H09-120914 | 5/1997 |

OTHER PUBLICATIONS

Zanini et al, "Micromagnet structures for magnetic positioning and alignment", Journal of Applied Physics Letters, 111, 07B312, 2012, http://dx.doi.org/10.1063/1.3675067, 3 pages.*

(Continued)

*Primary Examiner* — Yogendra N Gupta
*Assistant Examiner* — Emmanuel S Luk
(74) *Attorney, Agent, or Firm* — Occhiuti & Rohlicek LLP

(57) ABSTRACT

A method for producing a film including a non-magnetic matrix and a plurality of three-dimensional magnetic microstructures arranged within the matrix according to a predetermined pattern. The method includes providing a master substrate with a magnetically structured face formed from a plurality of magnetic field micro-sources, having a magnetic field gradient of between $10^2$ and $10^6$ T/m. The method also (Continued)

includes adding magnetic microparticles or nanoparticles to the magnetically structured face of the master substrate, the particles agglomerating into three-dimensional microstructures arranged under an effect of an attractive magnetophoretic force exerted by the magnetic field gradient on the surface of the master substrate. The method further includes depositing, on the magnetically structured face of the master substrate, a matrix made from a non-magnetic material, in such a way as to enclose the arranged microstructures and to form the film and peeling the film from the master substrate.

18 Claims, 11 Drawing Sheets

(51) Int. Cl.
    *B29C 51/00*     (2006.01)
    *B29D 7/01*     (2006.01)
    *H01F 41/00*     (2006.01)
    *B29C 39/00*     (2006.01)
    *B29K 83/00*     (2006.01)
    *B29K 505/12*     (2006.01)
    *B29L 7/00*     (2006.01)

(52) U.S. Cl.
    CPC ............... *B29D 7/01* (2013.01); *B29D 23/00* (2013.01); *H01F 41/005* (2013.01); *B29K 2083/00* (2013.01); *B29K 2505/12* (2013.01); *B29K 2995/0008* (2013.01); *B29L 2007/002* (2013.01)

(56) References Cited

U.S. PATENT DOCUMENTS

| | | | | |
|---|---|---|---|---|
| 5,985,419 | A * | 11/1999 | Schlueter, Jr. | B32B 27/20 399/307 |
| 6,011,946 | A * | 1/2000 | Eddy | G03G 15/2057 399/324 |
| 6,521,324 | B1 * | 2/2003 | Debe et al. | B41M 5/38207 156/235 |
| 7,790,304 | B2 * | 9/2010 | Hendricks et al. | H01M 4/8636 429/524 |
| 9,780,318 | B2 * | 10/2017 | Johnson | H01L 51/0097 |
| 2011/0171494 | A1 * | 7/2011 | Lin | G11B 5/64 428/827 |

OTHER PUBLICATIONS

Dempsey et al, "Micro-magnetic imprinting of high field gradient magnetic flux sources", Journal of Applied Physics Letters, 104, 262401, 2014, http://dx.doi.org/10.1063/1.4886375, 6 pages.*

Dempsey et al., "High performance hard magnetic NdFeB thick films for integration into Micro-Electro-Mechanical-Systems," Appl. Phys. Lett. 90, 092509, (2007).

Dumas-Bouchiat et al., "Thermomagnetically patterned micromagnets," Applied Physics Letters 96, 102-511 (2010).

Fahrni et al., "Magnetization and actuation of polymeric microstructures with magnetic nanoparticles for application in microfluidics," Journal of Magnetism and Magnetic Materials, vol. 321:12 (2009).

Issadore et al., "Self-assembled magnetic filter for highly efficient immunomagnetic separation," Lab on a Chip vol. 11:1 pp. 147-151(2011).

Vezy et al., "Simple method for reversible bonding of a polydimethylsiloxane microchannel to a variety of substrates," Micro and Nano Letters, vol. 6:10 (2011).

Walther et al., "Structural, magnetic and mechanical properties of 5 m thick SmCo films for use in Micro-Electro-Mechanical-Systems," Appl. Phys., American Institute of Physics (AIP), 103 (2008).

Walther et al., "Micro-patterning of NdFeB and SmCo magnet films for integration into micro-electro-mechanical-systems," Journal of Magnetism and Magnetic Materials 321, pp. 590-594 (2008).

Weng et al., "Development and research for applying innovative magnetic soft mold imprinting techniques in microstructure component manufacturing," Polymer for Advanced Technologies vol. 19:9 (2008).

Notification of Reasons for Refusal, Japanese Application No. 2015-513163, dated Apr. 4, 2017 (4 pages).

* cited by examiner

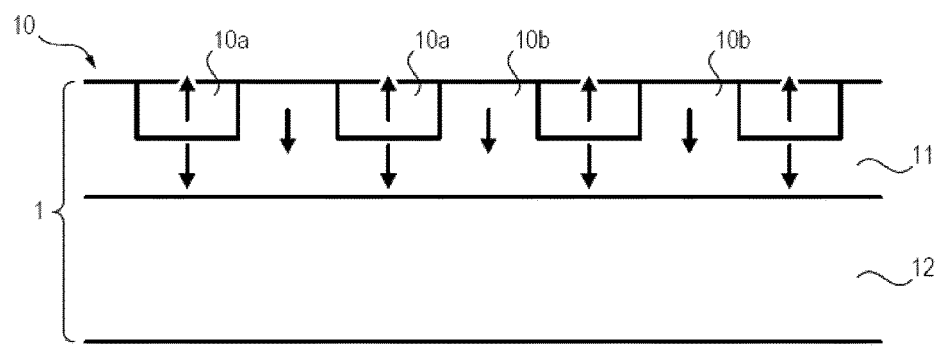
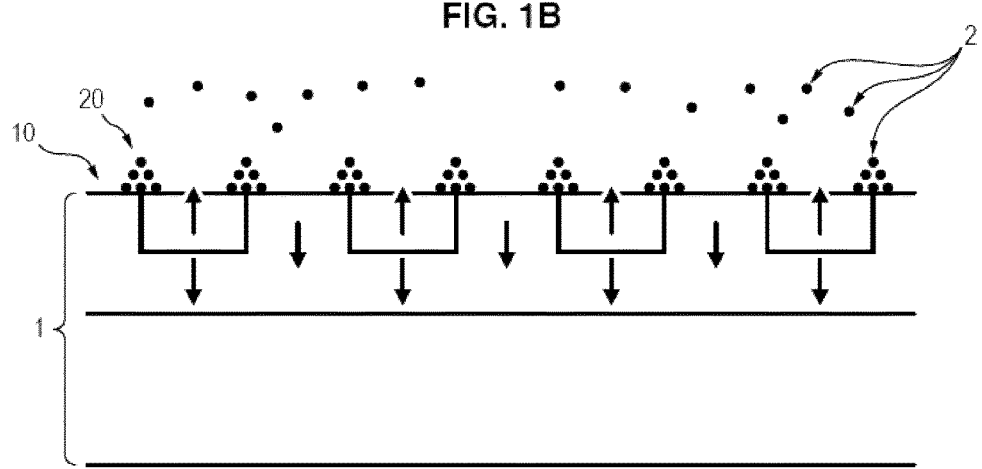

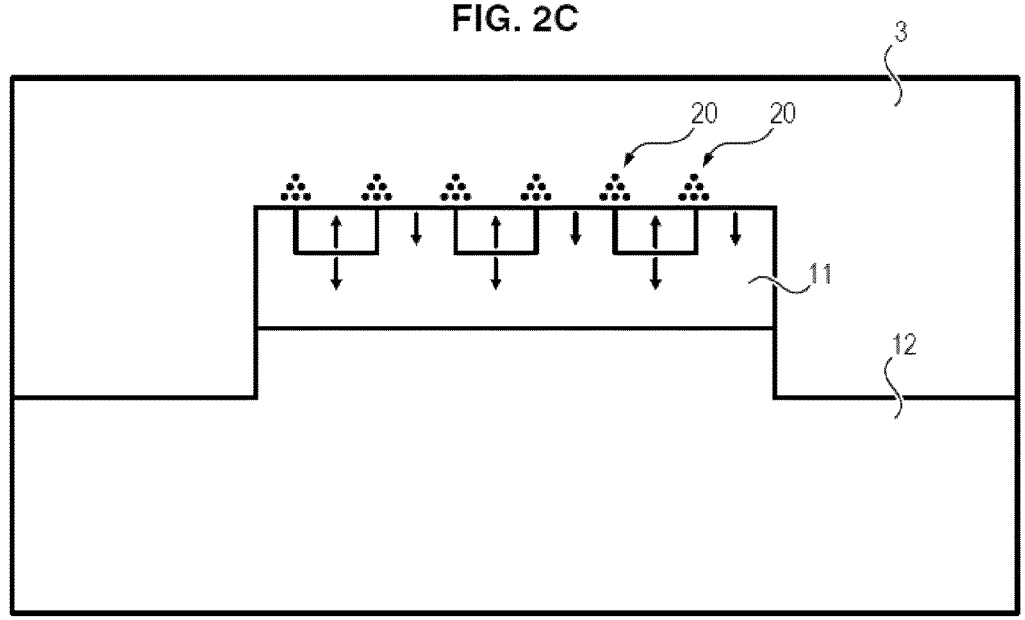
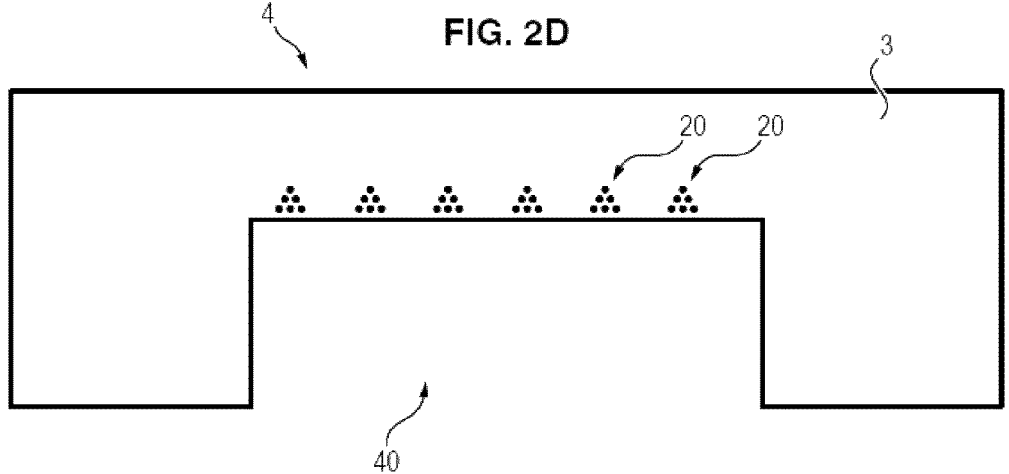

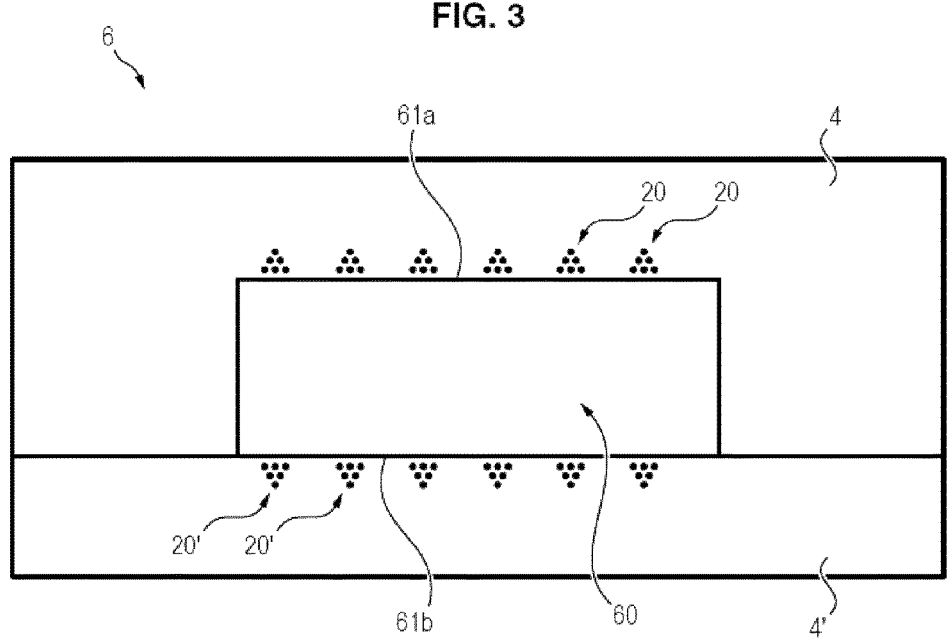
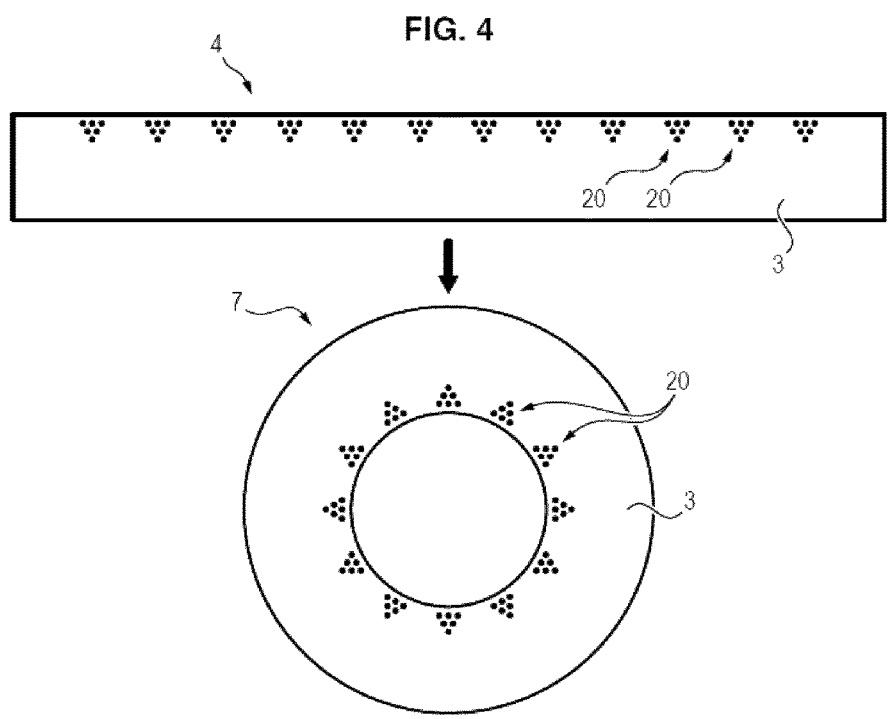

100 μm

100 μm

METHOD FOR PRODUCING A FILM COMPRISING THREE-DIMENSIONAL MAGNETIC MICROSTRUCTURES

FIELD OF THE INVENTION

The present invention relates to a method for producing a film comprising a non-magnetic matrix and a plurality of three-dimensional magnetic microstructures arranged within the matrix according to a predetermined pattern.

BACKGROUND TO THE INVENTION

Magnetophoresis relates to the movement of an object under the effect of an inhomogeneous magnetic field.

It is currently used for handling operations such as trapping, separation, mixing and transportation of objects, including, for example, biological species functionalized by magnetic nanoparticles or microparticles.

The magnetophoretic force acting on a magnetic particle is given by the expression:

$$F_m = M_p \nabla B \tag{1}$$

where $M_p$ is the magnetic moment of the particle, proportional to its volume, and $\nabla B$ is the magnetic field gradient in which the particle is placed.

According to equation (1), the magnetic force exerted on an object placed in a homogeneous magnetic field is zero, independently from the value of the magnetic field, however high it is.

Consequently, one of the necessary conditions for generating significant magnetic forces is the existence of a magnetic field gradient, i.e. the existence of a local inhomogeneity of the magnetic field in space.

The aim is therefore to generate the strongest possible magnetic field gradients, and to do so on a sub-millimetric scale.

Microdevices mainly developed for the control and/or handling of ferromagnetic or superparamagnetic objects currently use microcoils or soft materials coupled to an external magnetic field, possibly in association.

The first type of microdevice is based on the use of microcoils typically implemented by conventional micro-manufacturing techniques such as photolithography.

However, these microcoils suffer from three major disadvantages.

On the one hand, the generated magnetic fields are limited by the heating of the circuit.

In fact, the magnetic field generated by a coil with a resistance R is directly proportional to the intensity I of the current flowing through it.

The flow of a current of intensity I, during a time t, in a circuit causes heating through the Joule effect ($RI^2 \times t$), which inevitably results in a limitation of the current and therefore a limitation of the generated magnetic field.

By way of example, the continuous current in a copper conductor with a 100 µm² cross section is in the order of $10^{-4}$ A.

The magnetic field of a single coil with a 10 µm radius of such a conductor is in the order of 0.1 mT and the maximum magnetic field gradient is in the order of $10^2$ T/m.

Fed with pulsed current, the microcoils can generate much higher fields than with continuous current, typically 1000 times greater, but during a time which is often less than one millisecond, which is unsuitable for the intended applications.

Furthermore, these microcoils always require an external current feed for their operation.

The second type of microdevice combines the use of soft magnetic materials with an external macroscopic magnetic field.

Placed in an external magnetic field, the soft magnetic material becomes magnetized and then behaves in a manner similar to a permanent magnet as a field source.

The soft materials for magnetic field micro-sources are implemented by micro/nanomanufacturing techniques.

The magnetic field sources obtained have the size of the patterns of the implemented soft materials, with a sub-millimetric dimension.

Placed in an external macroscopic magnetic field, these sources produce strong magnetic fields and field gradients, substantially modulated on the scale of the patterns.

The use of a variable and switchable external magnetic field renders these magnetic sources variable and switchable.

Finally, the manufacturing of devices comprising a film made from a hard magnetic material deposited on a silicon substrate, structured either topographically by using micro-manufacturing techniques [Walther09], or thermomagnetically [Dumas-Bouchiat10], in such a way as to form a plurality of micromagnets, has recently been described.

These devices offer the advantage of being autonomous, since, once magnetized, they require neither an energy source nor an external magnetic field source.

Furthermore, the micromagnets thus formed produce strong magnetic field gradients, up to $10^6$ T/m.

However, the manufacturing of these different devices is costly, since it requires leading-edge technologies, and is not therefore suitable for the production of large series of low-cost devices.

In particular, techniques based on silicon substrates are limited by the available sizes of these substrates and therefore face the impossibility of forming devices with large dimensions.

Furthermore, a certain flexibility of the devices would be desirable for some applications.

Furthermore, it would be useful, for example for in vitro applications, to have transparent or more or less translucent devices in such a way as to be able to observe, through optical transmission microscopy, the behavior of particles influenced by the generated magnetic field.

The article by D. Issadore et al., "Self-Assembled magnetic filter for highly efficient immunomagnetic separation", Lab Chip, 2011, 11, pp. 147-151, reports on the manufacturing of a polymer film comprising the placing in suspension, in polydimethylsiloxane (PDMS), of particles of NdFeB, the magnetization of said particles through the application of an intense external magnetic field, then the reticulation of the PDMS, fixing the NdFeB particles.

However, the distribution of the particles in the PDMS matrix is random.

Furthermore, each particle is isolated from the particles surrounding it, in such a way that the traps thus formed have the size of an individual particle and therefore have a limited trapping capability.

A need therefore exists for the manufacturing of a device which produces, on a submillimetric scale, a high magnetic field gradient, and which can be manufactured at a low cost.

Furthermore, according to the intended applications, this device must be able to be flexible and/or transparent.

Another object of the invention is to define a simple and economical method for producing a device capable of being magnetized, either in a permanent manner or under the action of an external magnetic field, in order to generate a substantial magnetic field gradient on a submillimetric scale.

BRIEF DESCRIPTION OF THE INVENTION

According to the invention, a method is proposed for producing a film comprising a non-magnetic matrix and a plurality of three-dimensional magnetic microstructures arranged within said matrix according to a predetermined pattern, including the steps of:
providing a master substrate, comprising a magnetically structured face formed from a plurality of magnetic field micro-sources, having a magnetic field gradient of between $10^2$ and $10^6$ T/m,
adding magnetic microparticles or nanoparticles to the magnetically structured face of said master substrate, said particles agglomerating into three-dimensional microstructures arranged under the effect of the attractive magnetophoretic force exerted by the magnetic field gradient on the surface of the master substrate,
depositing, on the magnetically structured face of the master substrate, a matrix made from a non-magnetic material, in such a way as to enclose said arranged microstructures and to form said film,
peeling said film from the master substrate.

A nanoparticle is understood to mean a particle of which the dimensions are on a nanometric scale, i.e. the characteristic size of which, for example the mean diameter, is less than 100 nm.

A microparticle is understood to mean a particle of which the dimensions are on a micrometric scale, i.e. the characteristic size of which, for example, the mean diameter, is between 100 nm and 1 mm.

A micromagnet is understood to mean a magnet of which at least two dimensions are on a micrometric scale, i.e. the thickness and/or length and/or width of which are between 100 nm and 100 μm.

"Magnetic structuring of a surface" (whether it be plane, curved and/or having reliefs (projections or cavities)) is understood to mean that the surface has different magnetization regions, distributed according to a predetermined pattern.

"Fill factor" is understood to mean the ratio of the volume occupied by the nanoparticles or microparticles arranged in three-dimensional structures in a portion of the film to the volume of the portion concerned.

According to one embodiment, before the deposition of the magnetic microparticles or nanoparticles, a layer is deposited on the magnetically structured face of the master substrate in such a way as to facilitate the subsequent peeling of the film from the master substrate.

The matrix may be made from an elastomer material, which enables the formation of a flexible film.

For other applications, the matrix may, on the contrary, be made from a rigid material.

The preferred materials for the matrix could include an elastomer (for example polydimethylsiloxane (PDMS), rubber, etc.), a thermoplastic material (for example methyl polymethacrylate (PMMA), parylene, polystyrene, etc.), a thermosetting material (for example polyester, epoxy resin, Bakelite, photosensitive resin (for example SU-8), etc.), an oxide such as $SiO_2$, $Al_2O_3$ or $HfO_2$, a metal such as Cu or Ag, or a carbon material, such as graphite or DLC.

In a particularly advantageous manner, during or after the deposition of said microparticles or nanoparticles on the master substrate, said master substrate and/or the particles are agitated in such a way as to optimize the distribution of the microparticles or nanoparticles in relation to the magnetic field micro-sources.

Furthermore, before the deposition of the non-magnetic matrix, a jet of gas can be applied to the master substrate, in such a way as to optimize the distribution of the nanoparticles in relation to the magnetic field micro-sources and/or to eliminate the particles not trapped by the magnetic field of the master substrate.

According to one advantageous embodiment, before the deposition of the non-magnetic matrix, a liquid-phase ligand is deposited on the microstructures arranged on the surface of the master substrate in such a way as to reinforce the mechanical cohesion of the microparticles or nanoparticles forming said microstructures.

The film resulting from this method thus has two opposite faces between which the microparticle or nanoparticle fill factor varies, the face previously in contact with the master substrate having in its vicinity a fill factor greater than the fill factor in the vicinity of the opposite face.

Possibly, after the peeling of the film, an electrically conducting material is deposited on at least a part of the surface of the film.

According to one application of the invention, when the film is flexible, it can be wound in such a way as to form a tube.

According to one embodiment of the invention, the magnetically structured face of the master substrate has at least one cavity and/or at least one projection, in such a way that, after the peeling, the film has a projection and/or a cavity respectively complementary to the cavity and/or projection of the master substrate.

According to a different embodiment of the invention, the matrix comprises a thermoplastic material and, after the peeling of the film, said film is shaped against a mold through thermoforming.

According to one embodiment of the invention, the microparticles or nanoparticles are made from a soft magnetic material.

In a preferred manner, said microparticles or nanoparticles are then made from one of the following materials: Fe, CoFe, NiFe, $Fe_3O_4$, or $Fe_2O_3$.

Alternatively, the microparticles or nanoparticles are made from a hard magnetic material.

Said microparticles or nanoparticles are then preferably made from one of the following materials: NdFeB, FePt, SmCo, $BaFe_{12}O_{19}$, $SrFe_{12}O_{19}$, or $CoFe_2O_4$.

In this case, the film can advantageously be subjected to an external magnetic field in such a way as to permanently magnetize the three-dimensional magnetic microstructures.

According to other characteristics of the invention, taken individually or in combination:
the mean characteristic size of the magnetic microparticles or nanoparticles is between 10 nm and 100 μm;
one dimension of said three-dimensional magnetic microstructures in a plane parallel to the magnetically structured face of the master substrate is between nm and 500 μm;
the dimension of said three-dimensional magnetic microstructures in a plane perpendicular to the magnetically structured face of the master substrate is between 10 nm and 1 mm.

The invention also relates to a method for manufacturing a magnetic device comprising a plurality of micromagnets, comprising the production of a film according to the method described above and the application of an external magnetic field to said film in such a way as to magnetize the three-dimensional magnetic microstructures enclosed in the matrix of the latter.

According to one advantageous embodiment of the invention, a film is produced comprising at least one cavity, and said cavity is closed to form a microfluid channel by assembling said film with a film having a magnetically structured surface produced by the same method as that described above, said microfluid channel thus having two magnetically structured walls.

Another object of the invention relates to a film comprising a non-magnetic matrix and a plurality of three-dimensional magnetic microstructures arranged within said matrix according to a predetermined pattern, said microstructures being formed from an agglomerate of magnetic microparticles or nanoparticles.

The matrix is preferably made from a material chosen from an elastomer (for example polydimethylsiloxane (PDMS), rubber, etc.), a thermoplastic material (for example methyl polymethacrylate (PMMA), parylene, polystyrene, etc.), a thermosetting material (for example polyester, epoxy resin, Bakelite, photosensitive resin (for example SU-8), etc.), an oxide such as $SiO_2$ or $Al_2O_3$, a metal such as Cu or Ag, and a carbon material, such as graphite and DLCs.

According to other optional characteristics of said film:
one dimension of said three-dimensional magnetic microstructures in a plane parallel to the faces of the film is between 10 nm and 500 µm;
the dimension of said three-dimensional magnetic microstructures in a plane perpendicular to the faces of the film is between 10 nm and 1 mm.

The invention also relates to a device comprising a plurality of micromagnets, said device comprising a film as described above, the three-dimensional magnetic microstructures being magnetized permanently or by an external magnetic field.

According to one embodiment of said device, the film comprises at least one cavity and said film is assembled into a film having a magnetically structured surface, in such a way that said cavity forms a microfluid channel with said film.

According to one embodiment, said device has the shape of a tube formed by winding the film.

Finally, another object of the invention relates to a method for recovering magnetic particles from a powder, characterized in that said powder is made to pass over a conveyor belt, at least a part of the surface of which comprises a film as described above, and in that the magnetic particles to be recovered are trapped by microstructures disposed in said film.

According to one embodiment, the particles to be recovered contain rare earths.

According to a different embodiment, the particles to be recovered contain platinum and/or palladium.

According to a different embodiment, the powder contains kaolin, and the particles to be recovered in order to decontaminate said powder are ferromagnetic, ferrimagnetic or paramagnetic particles.

According to a different embodiment, a nuclear waste powder is functionalized by ferromagnetic, ferrimagnetic or superparamagnetic particles in such a way as to recover said waste by trapping the magnetic particles to which they are attached.

Finally, the invention relates to a device for recovering magnetic particles from a powder, characterized in that it comprises at least one conveyor belt for the passage of said powder and in that at least one part of the surface of said conveyor belt which is intended to be in contact with the powder comprises a film as described above.

BRIEF DESCRIPTION OF THE DRAWINGS

Other characteristics and advantages of the invention will become evident from the detailed description which follows, with reference to the attached drawings, in which:

FIGS. 1A to 1F schematically show different steps, some of which are optional, of producing a film according to one embodiment of the invention;

FIGS. 2A to 2D schematically show different steps of producing a film according to one embodiment of the invention;

FIG. 3 shows the formation of a fluid microchannel from a film obtained according to the invention;

FIG. 4 shows the formation of a tube from a film obtained according to the invention;

Figure 1C:
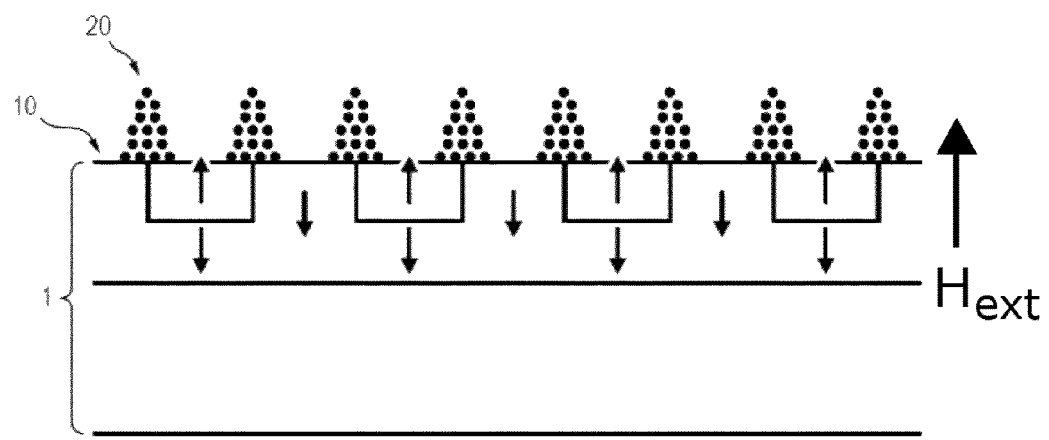

In order to render them more easily understandable, the diagrams have not been drawn to scale.

DETAILED DESCRIPTION OF EMBODIMENTS OF THE INVENTION

With reference to FIG. 1A, a master substrate 1 is used to arrange nanoparticles or microparticles before enclosing them in a non-magnetic matrix.

Master Substrate

Said master substrate 1 has a magnetically structured face, i.e. a face 10 formed from a plurality of magnetic field micro-sources 10a, 10b.

The magnetization of the different micro-sources is indicated schematically by an arrow.

In FIGS. 1A to 1G, the magnetically structured face 10 of the master substrate is plane.

However, in certain embodiments of the invention, it may be preferable to use a master substrate of which the face is not plane, but has cavities or projections, in order to reproduce complementary projections or cavities in the film formed from the master substrate.

The master substrate may be produced by different techniques known to the person skilled in the art.

According to one embodiment, the production of the master substrate entails the implementation of two main successive steps:
the synthesis of a powerful magnetic film over a thickness in the order of 1 to 100 µm;
the implementation of micromagnets through magnetic structuring of said film.

In a particularly advantageous manner, the synthesis of the magnetic film may be carried out through physical triode pulverization deposition.

By way of example, layers of NdFeB and SmCo have been synthesized and have notable magnetic properties [Dempsey07, Walther08].

Other methods for producing magnets in layers can be envisaged, in particular electrolytic depositions, sol-gel depositions, evaporation depositions, pulsed laser deposition, etc.

From the film thus synthesized, the generation of substantial magnetic fields and magnetic field gradients requires a submillimetric-scale magnetic structuring.

Two techniques presented below can be used for this purpose.

On the one hand, magnetic structuring by the "topographic" method consists of structuring, before deposition, the surface topology of the substrate on which the magnetic material is then deposited and/or directly structuring the topology of the magnetic layer.

This entails forming a magnetic layer which is not plane, but which comprises micro-projections and/or micro-cavities.

The dimensions of the topographic structuring determine the dimensions of the micromagnets obtained.

Each magnetic film element etched and/or deposited on a micro-projection or in a micro-cavity of the substrate can be likened, following magnetization, to an independent micromagnet.

It should be noted that optical lithography, chemical etching and planarization steps may be necessary.

The micro-elements implemented in this way are then magnetized according to a chosen direction.

They then form a set of independent micromagnets, all having the same direction of magnetization.

In this method, the magnetic material may be hard, in which case the magnetization of the micromagnets is permanent and the master substrate is then autonomous, i.e. does not require any energy supply or any application of an external magnetic field.

Alternatively, the magnetic material used is a soft material.

In this case, the use of the master substrate requires the simultaneous application of an external magnetic field in order to magnetize the micromagnets.

These individual micromagnets, located at different heights in relation to a medial surface of the magnetic film, form systems having very strong magnetic field gradients on micrometric scales.

On the other hand, magnetic structuring through "Thermo-Magnetic Patterning" (TMP) consists of using a heat source to locally heat certain areas of a magnetically hard layer and thus create magnetization volumes of alternate directions, forming micromagnets.

By way of example, a nanosecond pulse laser can be used as a heat source.

A hard magnetic layer is magnetized in a given direction and course.

This layer is then placed in a uniform external magnetic field $H_{ext}$ ($\mu_0 H_{ext} < \mu_0 H_c$) with a direction opposite to the direction of the original magnetization, then it is locally irradiated by a KrF (248 nm) excimer pulse laser.

The temperature on the surface of the irradiated areas increases very rapidly, then the heat is diffused into the material.

Given the reduction in the coercitive field $\mu_0 H_c$ of a material when its temperature increases, the magnetic reversal of the irradiated areas can be obtained through application of an external magnetic field during the laser pulse.

The layer is ultimately formed from a network of micromagnets with alternate magnetizations and dimensions defined by the dimensions of the mask used during the laser irradiation.

Alternatively, the layer can be heated through laser irradiation in the absence of a magnetic field. In this case, the irradiated areas will be demagnetized, which also causes the creation of a strong magnetic field gradient. In some cases, the irradiated areas can be magnetized by the magnetic field of the layer itself.

The systems implemented by this method have very strong magnetic field gradients on micrometric scales.

This thermo-magnetic patterning principle can be extended to all types of hard magnetic layers, including those having isotropic or in-plane magnetizations.

Other embodiments of the master substrate can obviously be chosen by the person skilled in the art without departing from the framework of the present invention.

Thus, for example, a structured magnetic film produced according to the inventive method can in turn be used as a master substrate.

According to a different example, the master substrate may be formed from a plurality of conducting microcoils.

In a non-limiting example shown in FIG. 1A, the master substrate is formed from a magnetically hard layer 11 of NdFeB having a thickness of 5 μm on a silicon support substrate 12.

The NdFeB alloy of the layer 11 has been treated by thermo-magnetic patterning, i.e. a localized heating of the layer 11 through laser irradiation through a mask in the presence of an external magnetic field, in such a way as to form, in the openings of the mask, regions 10a of magnetization opposite to that of the regions 10b protected by the mask.

On the surface of the master substrate, the intensity of the magnetic field and the magnetic field gradient is maximal at the interfaces between the regions 10a, 10b having opposite magnetizations.

Consequently, nanoparticles or microparticles having a positive magnetic susceptibility are attracted by the magnetophoretic force towards these interfaces.

However, the master substrate is not limited to this particular form, but may be formed from a hard or soft magnetic material structured by topography.

The master substrate may possibly be formed from a network of microcoils.

When the master substrate has a surface structured by topography, i.e. non-plane, this particular topography can be used to imprint a form complementary to the final film.

If a plane film is to be formed from such a master substrate, it is necessary to planarize the latter in advance, either by removing material (for example by means of mechano-chemical polishing to remove the projections), or by adding material (for example by means of a technique to fill the cavities).

Magnetic Nanoparticles/Microparticles

With reference to FIG. 1B, magnetic nanoparticles or microparticles are applied to the magnetically structured face of the master substrate 1.

This application of particles can be carried out by any appropriate technique; this may involve, for example, a dusting (in the case of a dry particulate powder), a casting (in the case of particles in suspension in a fluid), etc.

Under the effect of the attractive magnetophoretic force of the magnetically structured face of the master substrate, the particles agglomerate at the edges of the micro-sources.

The agglomerates are therefore distributed according to a pattern which corresponds to the pattern of the edges of the magnetic field micro-sources of the master substrate.

Insofar as the force decreases with movement away from the face of the master substrate, these agglomerates generally have a triangular or trapezoidal cross section, with a wider base on the side of the master substrate 1 and reducing with the distance.

In order to facilitate the arrangement of the particles not only in a plane but also in a direction perpendicular to the master substrate, it is possible to simultaneously apply an external magnetic field having an appropriate direction.

FIG. 1C shows an embodiment in which an external magnetic field $H_{ext}$ is applied which is perpendicular to the magnetically structured face of the master substrate, and which tends to increase the height of the agglomerates of the nanoparticles or microparticles in a direction perpendicular to the face 10 of the master substrate.

During the deposition of the particles, the master substrate is advantageously agitated in such a way as to optimize the trapping of the particles at the edges of the magnetic field micro-sources.

Furthermore, during or after the deposition, a jet of dry gas can be projected in order to facilitate the trapping of the particles at said interfaces and/or to eliminate the untrapped particles before the deposition of the non-magnetic matrix.

According to one embodiment, the particles are made from a soft magnetic material.

In this case, during the use of the film containing them, it will be necessary to apply an external magnetic field in order to magnetize them.

According to a different embodiment, the particles are made from a hard magnetic material.

In this case, the application, after the formation of the film, of an external magnetic field will allow them to be magnetized in a permanent manner and thus form an autonomous magnetically structured film.

When the particles have been applied to the master substrate by means of a fluid, said fluid is evaporated once the particles have been arranged under the effect of the magnetophoretic force.

Figure 1D:
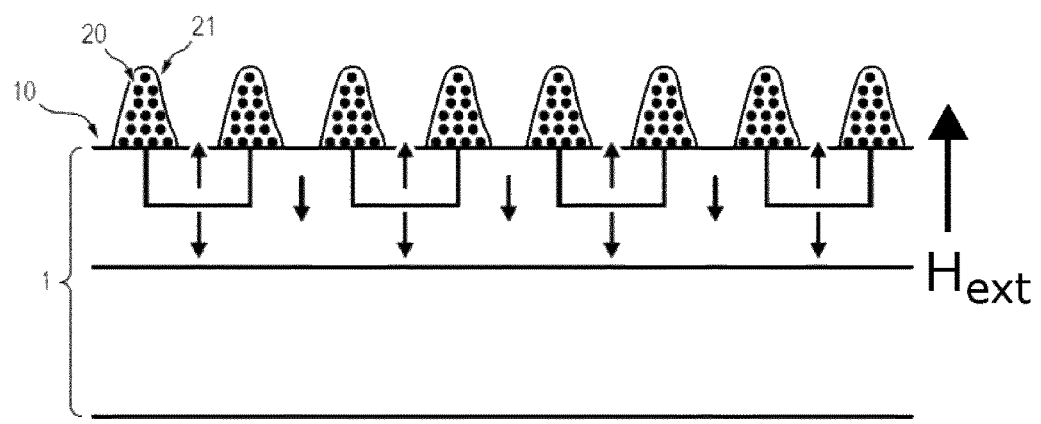

According to one embodiment shown in FIG. 1D, a liquid-phase ligand 21 is deposited on the agglomerates of nanoparticles or microparticles disposed on the surface of the master substrate, the effect of which is to reinforce the mechanical cohesion of the particles.

The agglomerates are thus less susceptible to being deformed during the subsequent formation of the matrix.

By way of a non-limiting example, an appropriate ligand is an SIS (styrene-isoprene-styrene) copolymer diluted in toluene: the SIS copolymer bonds to the agglomerated particles when the toluene is evaporated.

Non-Magnetic Matrix

Figure 1E:
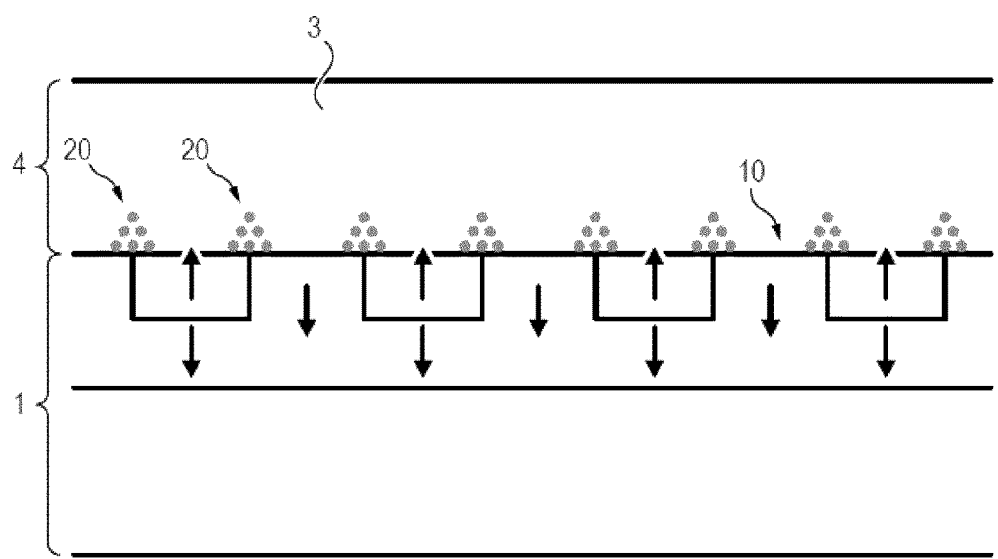

With reference to FIG. 1E, a matrix made from a non-magnetic material is then cast or deposited in the form of a layer on the agglomerated particles on the master substrate.

The matrix is advantageously in the form of a fluid which, once poured onto the master substrate, can be spread over the surface of the latter by a "spin-coating" method.

The thickness of the matrix is typically between 100 nm and 5 mm.

The matrix is advantageously made from an elastomer material, which enables a certain flexibility to be imparted onto the film.

However, a rigid matrix may be preferable in other applications.

According to preferred embodiments of the invention, the matrix is made from one of the following materials: an elastomer (for example polydimethylsiloxane (PDMS), rubber, etc.), a thermoplastic material (for example methyl polymethacrylate (PMMA), parylene, polystyrene, etc.), a thermosetting material (for example polyester, epoxy resin, Bakelite, photosensitive resin (for example SU-8), etc.), oxides such as $SiO_2$ or $Al_2O_3$, metals, such as Cu or Ag, carbon materials, such as graphite or DLC (Diamond-Like Carbon), etc.

If necessary, the matrix is allowed to harden or reticulate during an appropriate period.

According to the subsequent applications of the film, it may be appropriate to choose a biocompatible material (e.g. PDMS) for the matrix, or to add a fine layer of a biocompatible material (for example, a layer of PDMS by "spin coating", or a layer of parylene through vapor-phase deposition).

Furthermore, the matrix may advantageously be made from a transparent or translucent material.

The person skilled in the art is capable of selecting an appropriate matrix from the products available on the market according to the desired properties.

Film Obtained

Figure 1F:
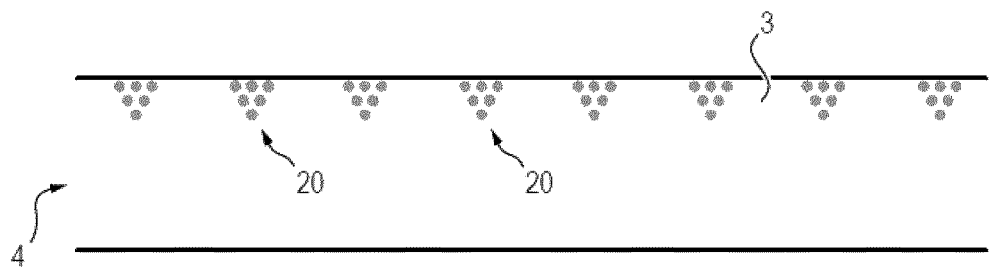

With reference to FIG. 1F, the film formed from the matrix and the magnetic particle agglomerates is peeled from the master substrate 1.

The master substrate may, for its part, be reused for the production of a new film.

Thus, although the master substrate requires the implementation of micromanufacturing techniques and consequently incurs a certain cost, it can be reused indefinitely and the production of the film itself, which does not involve such complex and costly techniques, only uses low-cost materials.

Furthermore, this method can easily be industrialized and enables the implementation of films with a large surface area in large quantities and at a low cost.

According to one embodiment of the invention, a layer of a material facilitating the peeling of the film can be deposited on the master substrate, before applying the particles.

This layer which facilitates the peeling preferably remains attached to the master substrate during the peeling.

This layer is, for example, made from parylene, Teflon©, etc.

Figure 1G:
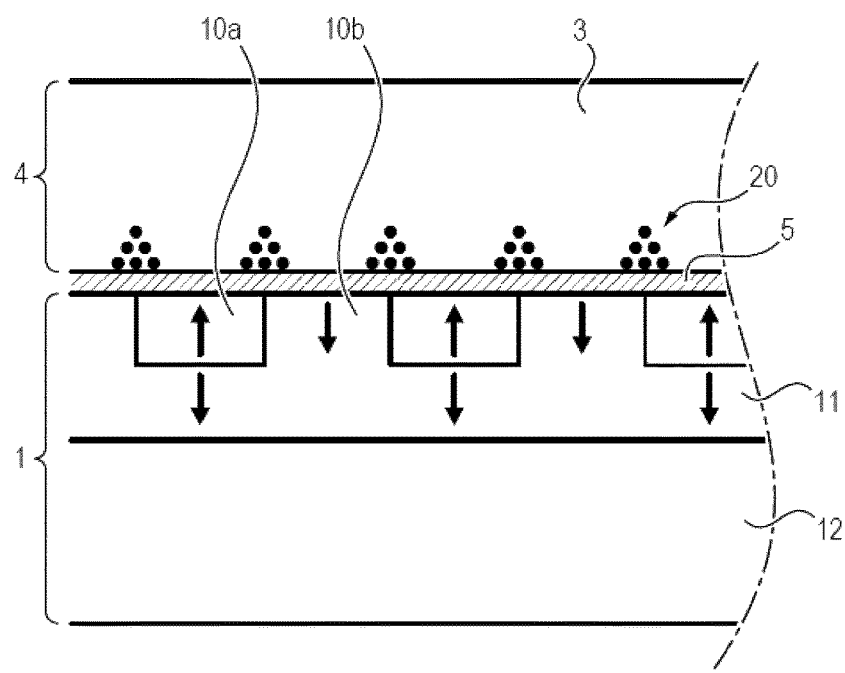
FIG. 1G schematically shows a variant of the embodiment shown in FIGS. 1A to 1D.

FIG. 1G shows an embodiment of the method in which the layer 5, the particles 2 and the non-magnetic matrix 3 have been successively deposited on the master substrate 1.

Even a very low thickness of the layer 5 enables the functions described above to be performed.

Thus, for example, the layer 5 may have a thickness of less than 1 mm, preferably between 10 nm and 10 µm, more preferably between 50 nm and 500 nm.

Following the peeling of the film from the master substrate, it is possible to render at least a part of the surface of the film enclosing the microparticles or nanoparticles as electrically conducting, by means of a deposition of an electrically conducting material.

The electrically conducting material is chosen according to its adhesive properties in relation to the material of the matrix and/or according to a possible need for transparency.

For example, a transparent conducting oxide, such as tin-doped indium oxide (ITO), is advantageously deposited for a transparent conducting layer.

If the electrically conducting layer does not need to be transparent, said layer may comprise a metal such as gold, platinum and/or palladium.

Moreover, according to the applications, an electrically conducting layer can be deposited over the entire surface of the film, or only on certain regions of the surface, according to a predetermined pattern, for example in order to locally form electrodes (for the application of an electrical field) or coils (for the application of a magnetic field).

In this last case, micromanufacturing techniques (deposition, lithography, etching, etc.) can be used for the microstructuring of the conducting layer.

According to one embodiment shown in FIGS. 2A to 2D, the magnetically structured face of the master substrate 1 is not plane, but has at least one projection or cavity, the negative of which will be present on the film.

Figure 2A:
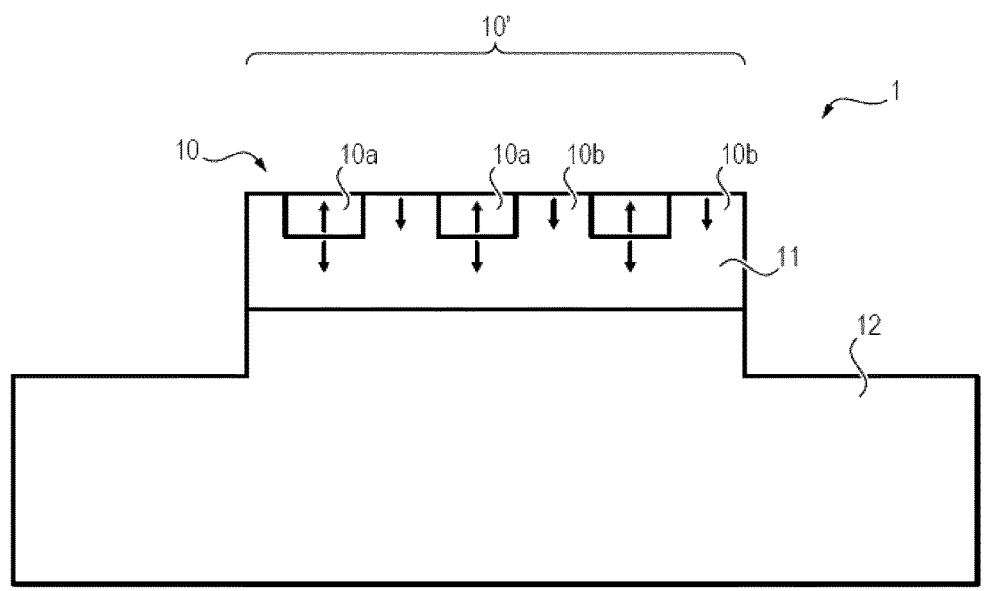

In the non-limiting example shown in FIG. 2A, the magnetically structured face 10 of the master substrate 1 has a projection in relief 10', the surface of the projection being formed from a plurality of magnetic field micro-sources 10a, 10b.

For example, said projection may have a parallelepiped shape.

According to the intended applications, the remainder of the surface of the master substrate may also be magnetically structured, but it is also conceivable that only the surface of the projection 10' is magnetically structured; in this last case, the applied nanoparticles or microparticles are only agglomerated at the edges of the magnetic micro-sources forming the surface of the projection 10', the remainder of the surface of the master substrate not retaining any particles.

Figure 2B:
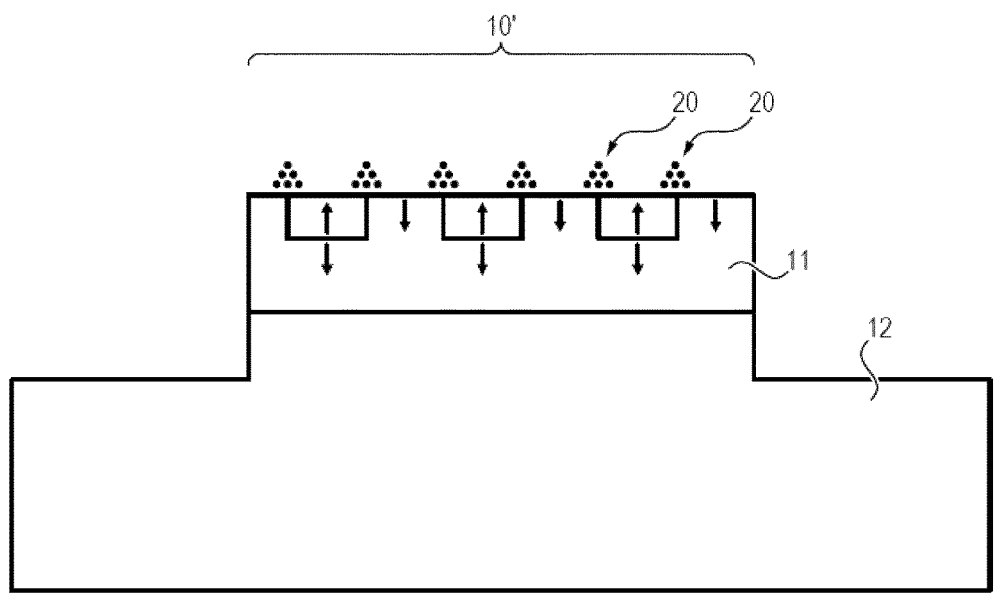

As explained above, the magnetic nanoparticles or microparticles, which are arranged and agglomerated in three-dimensional structures 20 on the edges of the magnetic field micro-sources 10a, 10b, are applied to the master substrate (FIG. 2B).

Then, with reference to FIG. 2C, the non-magnetic matrix 3 is deposited on the master substrate.

At the end of the peeling, the film 4 thus obtained, as shown in FIG. 2D, therefore has a cavity 40 complementary to the projection 10' of the master substrate.

According to the shape of the embossing, the film thus comprises one or more wells, or one or more channels.

A fluid microchannel can thus be formed from a film of this type.

For this purpose, as shown in FIG. 3, it suffices to apply, against said film 4, a plane film 4' or any other structure enabling the formation of the fourth wall of the cavity 40.

Advantageously, said plane film 4' can also be produced according to the invention and can comprise three-dimensional magnetic structures 20' on its surface.

Thus, a device 6 comprising a microchannel 60 which has a magnetically structured surface on two opposite walls 61a and 61b is formed from the films 4 and 4'.

A surface treatment can ensure that the two films are sealed.

For example, when the two films have a PDMS matrix, an activation of the surfaces by an oxygen plasma can be effected.

Due to the presence of three-dimensional magnetic structures on the two faces 61a and 61b of the microchannel 61, the trapping of nanoparticles or microparticles in a solution flowing in said microchannel is improved.

The nature of the magnetic particles, and also their distribution in relation to the surface of each wall, can obviously be identical or different for each of the two walls.

FIG. 4 shows another example of the application of the film 4 from FIG. 1D.

When the matrix 3 is made from a flexible material, for example an elastomer, it is possible to wind the film over itself to form a tube.

According to the intended use, the film 4 can be wound in such a way that the three-dimensional magnetic structures are located on the external wall of the tube 7 or on the internal wall of the latter (as shown in FIG. 4).

In the case of a thermoplastic matrix, the film can be heated to wind it.

Another possibility for shaping the film containing the microparticles, when the matrix comprises a thermoplastic material, is to produce a plane film and then thermoform it ("hot embossing").

Figure 5A:
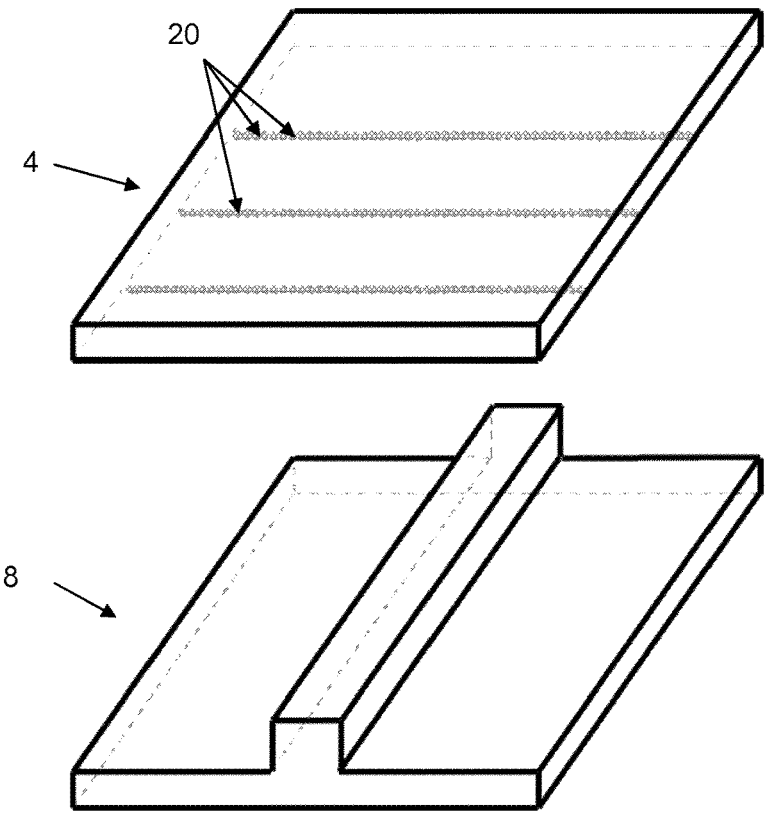
FIGS. 5A to 5D show the steps of the implementation of a fluid microchannel through thermoforming of a plane film obtained according to the invention.
Figure 5B:
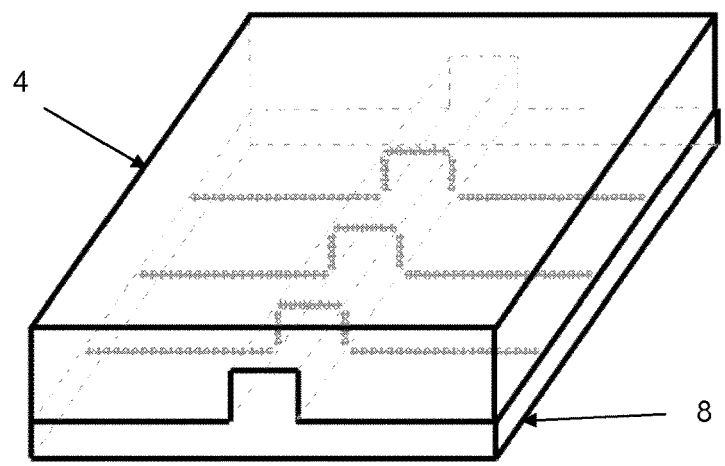
Figure 5C:
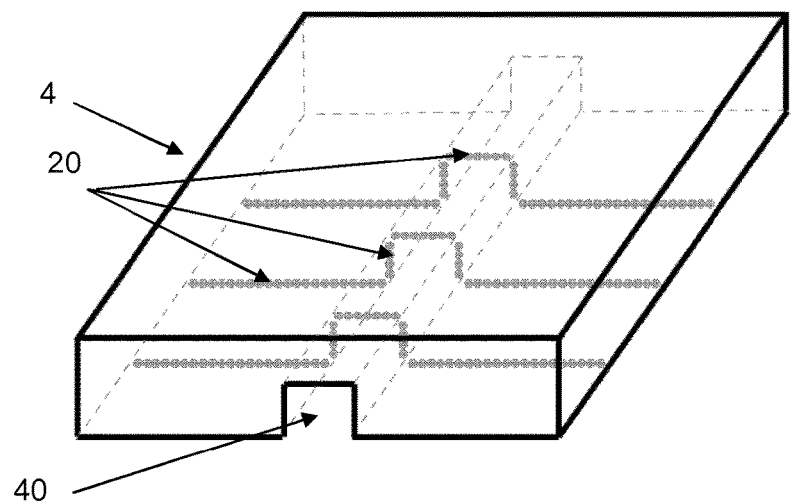

FIGS. 5A and 5C show an example embodiment of thermoforming of this type.

A plane film 4 is produced from a master substrate, the magnetically structured face of which is plane, according to the method described above.

In the example shown in FIG. 5A, the arranged microstructures are disposed according to parallel lines, but any other arrangement could obviously be implemented.

The matrix is made from a thermoplastic material, for example PMMA or polystyrene.

A mold 8 is provided, the surface of which is complementary to the shape to be imprinted on the film 4.

For example, if a channel is to be formed from the film 4, the mold 8 has a parallelepiped relief, of which the width corresponds to the width of the channel to be formed and the height corresponds to the depth of the channel.

The face of the film 4 in the region of which the microstructures are disposed is applied against the mold 8 under temperature and pressure conditions that are appropriate according to the material of the matrix, in order to impart the shape of the mold 8 on the film 4 without deforming said mold, the latter being made from a material resistant to thermoforming.

FIG. 5B shows the assembly of the mold 8 and the film 4 after heating and compression of the film.

The deformation of the surface of the film is accompanied by the shaping of the lines of microstructures according to the relief of the mold.

FIG. 5C shows the film 4 shaped following its removal from the mold.

In contrast to the use of a non-plane substrate, thermoforming therefore enables the formation of a cavity 40 of which all the walls (including the walls perpendicular to the main plane of the master substrate) comprise microstructures.

A fluid microchannel can therefore be formed from a film of this type.

Figure 5D:
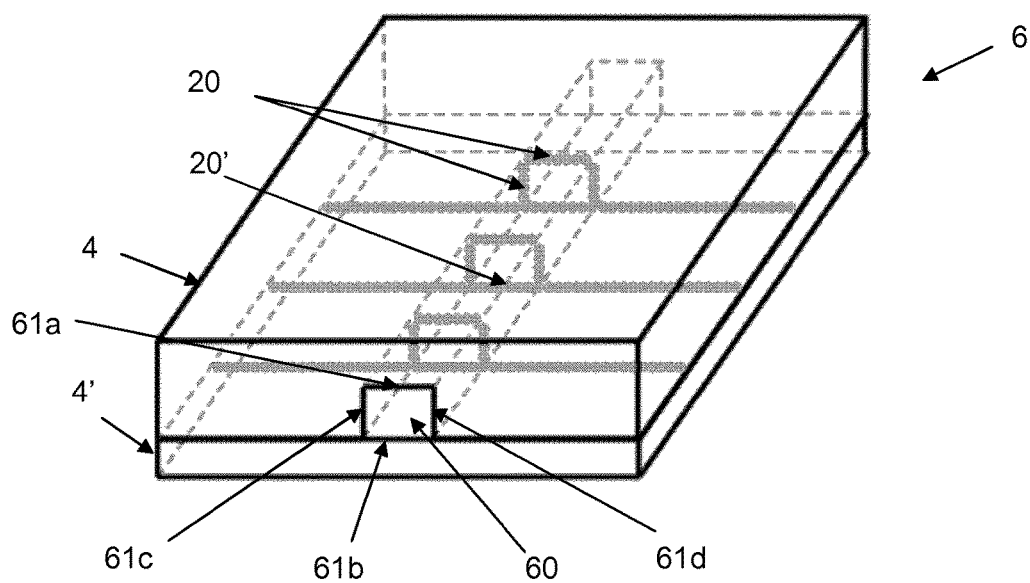

For this purpose, as shown in FIG. 5D, it suffices to apply, against said shaped film 4, a plane film 4' or any other structure enabling the formation of the fourth wall of the cavity 40.

Advantageously, said plane film 4' can also be produced according to the invention and can comprise three-dimensional magnetic structures 20' on its surface.

A device 6 comprising a microchannel 60 which has a magnetically structured surface on its four walls 61a, 61b, 61c and 61d is thus formed from the films 4 and 4'.

A surface treatment can ensure that the two films are sealed.

Due to the presence of three-dimensional magnetic structures on the four faces 61a to 61d of the microchannel 60, the trapping of nano-objects or micro-objects in a solution flowing in said microchannel is improved.

Experimental Results

The method described above has been carried out to produce a PDMS film enclosing the NdFeB microparticles.

Particles of this type are, for example, sold by the company Magnequench under the reference MQFP-B.

These particles have an irregular shape and a diameter varying between 1 and 10 µm, around a mean diameter in the order of 5 µm.

These particles, which are formed from randomly oriented nanocrystals, are magnetically isotropic (µ0Mr in the order of 0.8 T).

As explained in detail above, these particles were applied to the magnetically structured face of a master substrate (the micro-sources being disposed in the form of a chessboard, each square of which has sides measuring 100 µm), then a PDMS matrix was deposited.

In this example, the three-dimensional structures have a depth (in the thickness of the film) in the order of 5 µm and a maximum width (in the face of the film previously in contact with the master substrate) in the order of 20 µm.

Adjacent structures are separated by an interval of around 100 µm, which corresponds to the width of the magnetic field micro-sources of the master substrate.

Figure 6A:
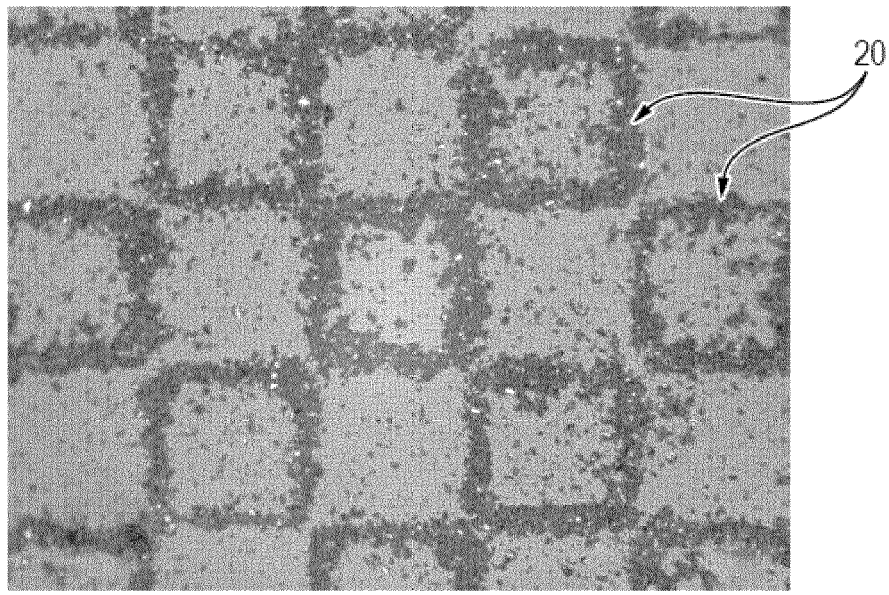
FIGS. 6A and 6B respectively show images in top view of a film obtained according to the invention and of microparticles trapped by said film.

FIG. 6A is an image in top view of the film through an optical microscope.

The structures 20 can be seen to be distributed there in the shape of a square pattern corresponding to the edges of the magnetic field micro-sources.

Following production, the film was exposed to a 4T external magnetic field, in such a way as to magnetize the NdFeB particles.

In fact, the magnetic field of the master substrate is, in this case, too weak to sufficiently magnetize these particles with a high magnetocrystalline anisotropy.

To show that the film thus formed can be used to trap magnetic microparticles, a solution based on fluorescent polystyrene microspheres having a diameter of 2.9 µm and containing around 30% by volume of superparamagnetic iron oxide inclusions, sold by the company Micro-particles GmbH, was deposited on the film and left to dry. These particles are considered as forming appropriate models for cells.

Magnetization measures carried out on these microspheres show that the iron oxide inclusions have a size of 3.3 nm±3 nm (standard deviation).

Figure 6B:
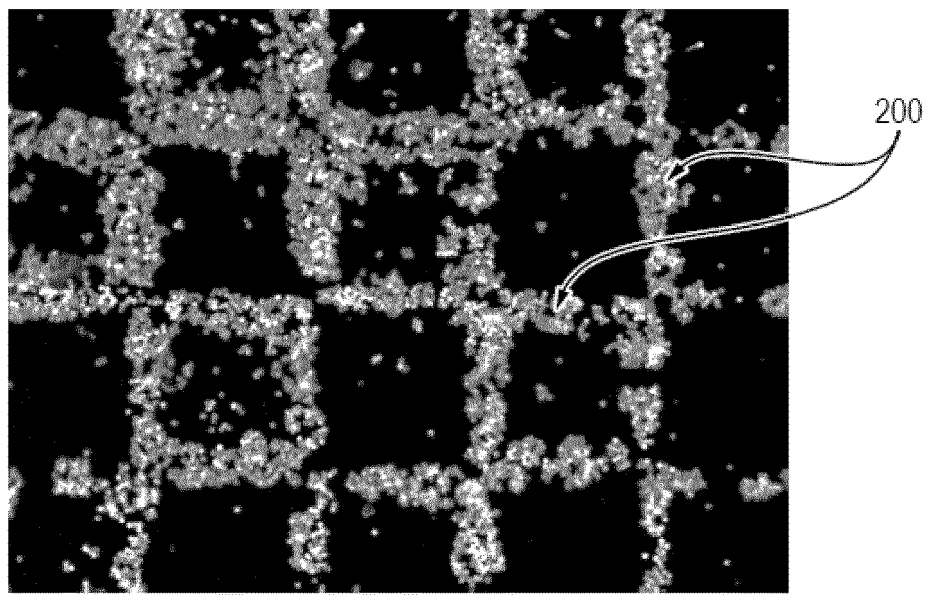

A fluorescence image in top view (FIG. 6B) clearly shows that the microspheres 200 have been trapped in the regions of the film in which the NdFeB three-dimensional structures are encapsulated.

Other tests were carried out with a polystyrene matrix and with a polyester matrix and demonstrated the feasibility of the film and its capacity for trapping magnetic particles.

Examples of Applications Relating to the Processing of Powders

Beyond the handling (trapping, separation, positioning, etc.) of magnetically functionalized biological species, the magnetophoretic properties of the magnetic microstructures organized in the matrix can be used to recover particles with positive magnetic (ferromagnetic, ferrimagnetic or paramagnetic) susceptibility within a powder.

According to the applications, this recovery can aim to extract particles of a material to be recycled from a powder, or, conversely, to clean a powder by removing particles of a contaminant material.

For this purpose, said powder is made to pass over a conveyor belt, at least part of the surface of which comprises a film as described above.

Thus, when said powder contains particles having a sufficient positive magnetic susceptibility, said particles are retained on the surface of the film.

The dimension of the particles to be recovered is typically between 50 nm and 50 µm.

It is preferably ensured that the powder is in contact with the largest possible film surface containing three-dimensional microstructures, in order to increase the probability of trapping the particles to be recovered by said microstructures.

Figure 7:
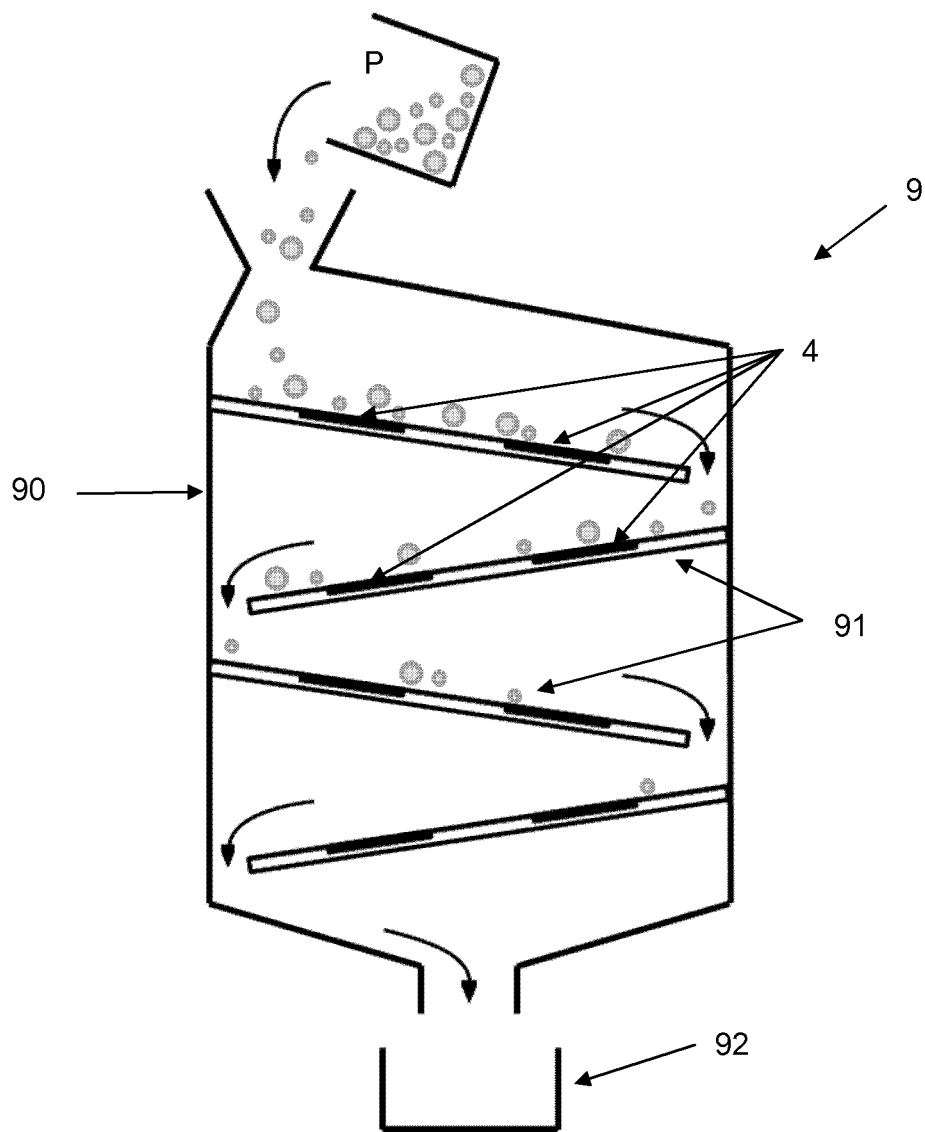
FIG. 7 schematically shows a device enabling the recovery of particles having a (ferromagnetic, ferrimagnetic or paramagnetic) positive magnetic susceptibility within a powder.

FIG. 7 shows an example of a device enabling the recovery method to be carried out.

The device 9 advantageously comprises an enclosure 90 which confines the powder, in such a way as to avoid or limit the exposure of external operators to the powder.

One or more conveyor belts 90, on the surface of which one or more films 4 comprising a non-magnetic matrix enclosing the arranged three-dimensional magnetic microstructures are disposed, are arranged within the enclosure.

The powder P is supplied, for example, at the top of the enclosure.

The powder P may be in dry form or in liquid phase.

The conveyor belts 90 are preferably inclined and disposed alternately in such a way as to make the powder travel over the largest possible surface of the conveyor belts.

A receptacle 92 is disposed at the end of the furthest downstream conveyor belt in order to collect the untrapped powder.

According to one embodiment, the microstructures can be formed from the same nanoparticles or microparticles and can be disposed according to the same pattern for all films.

In this case, if the particles to be recovered are made from a plurality of different materials, a segregation of the trapping is observed from the upstream to the downstream areas of the device, the particles formed from the material having the highest positive magnetic susceptibility tending to be trapped first.

According to one advantageous alternative, the segregation can be controlled by choosing the particles forming the microstructures and their arrangement in relation to the surface of each film 9 and the conveyor belts 91 in such a way as to generate different magnetic field gradients according to the location on the conveyor belt, adapted to preferentially trap certain particles.

Any appropriate means can be used to free the particles trapped on the conveyor belts.

This may involve mechanical means to detach the particles from the surface of the film 4, for example by means of a scraper.

Another possibility, if the microstructures are made from a soft magnetic material magnetized by an external magnetic field, is to interrupt the generation of this magnetic field; the microstructures thus lose their magnetization and no longer exert any attraction on the trapped particles. It is then possible to recover said particles through mechanical agitation (aspiration, shaking, blowing, etc.), for example.

A first example relates to the recovery of particles of relevant materials within a powder.

For example, said particles may contain rare earths.

In fact, the demand for rare earths is so high that it becomes economically viable to collect these elements in environments where they are present in small quantities.

For example, the recycling of iron-boron-neodymium magnets produces a powder of this alloy.

Similarly, the production of such magnets produces powders of this alloy, which it would be economically viable to recover.

With these particles being ferromagnetic, it is possible to trap them by means of films as described above.

The inventors furthermore discovered that it was possible to trap paramagnetic rare earth oxide powders, for example neodymium and samarium oxide.

This result opens the way to the recovery of rare earth oxides from mines of other materials where they are encountered, for example phosphate mines.

It is also possible to recover particles having a sufficiently high positive magnetic susceptibility, for example platinum and/or palladium particles.

The material of the nanoparticles or microparticles can be chosen to have a sufficient magnetization according to the magnetic susceptibility of the particles to be attracted.

It may be possible to increase the paramagnetic magnetization of the particles to be attracted by applying an external magnetic field, for example by means of a solid magnet, an electromagnet and/or a superconducting coil.

Another example of an application of the invention is the decontamination of a powder, comprising the recovery of contaminant or pollutant particles from within a powder.

The decontamination of kaolin powder, with the aim of removing the ferromagnetic or paramagnetic particles, can be cited as an example.

Another example of decontamination is that of nuclear waste in powder form.

Insofar as such waste has a low magnetic susceptibility, it is preferable to functionalize it with ferromagnetic, ferrimagnetic or superparamagnetic particles which can be trapped—with the waste to which they are attached—by the films according to the invention.

As the films are particularly inexpensive, it is possible to remove them from the conveyor belts once they are saturated with particles, to store them under appropriate conditions, and to replace them on the conveyor belts with new films.

REFERENCES

[Walther09] A. Walther, C. Marcoux and B. Desloges, R. Griechishkin, D. Givord and N. M. Dempsey, J. Magn. Mat. 321 (2009) 590

[Dempsey07] N. M. Dempsey, A. Walther, F. May, D. Givord, K. Khlopkov, O. Gutfleisch, Appl. Phys. Lett. 90 (2007), 092509

[Walther08] A. Walther, D. Givord, N. M. Dempsey, K. Khlopkov and O. Gutfleisch, J. Appl. Phys. 103 (2008) 043911

D. Issadore et al, "Self-Assembled magnetic filter for highly efficient immunomagnetic separation", Lab Chip, 2011, 11, pp. 147-151

[Dumas-Bouchiat10] F. Dumas-Bouchiat et al., App. Phys. Lett. 90, 102511 (2010).

The invention claimed is:

1. A method comprising producing a film, wherein said film comprises a non-magnetic matrix and three-dimensional magnetic microstructures arranged within said matrix according to a predetermined pattern, wherein producing said film comprises providing a master substrate, applying particles to a magnetically-structured face of said master substrate, and, after having applied said particles, providing said non-magnetic matrix on said magnetically-structured face and on said magnetic microstructures, and peeling said film from said master substrate, wherein providing said non-magnetic matrix comprises at least one of casting and depositing on said magnetically-structured face and on said magnetic microstructures, wherein said magnetically-structured face is formed from magnetic-field micro-sources having a magnetic-field gradient of between $10^2$ and $10^6$ teslas per meter, wherein, as a result of having at least one of casted and deposited said non-magnetic matrix, said film forms on said master substrate, wherein said matrix is made from a non-magnetic material, wherein said particles are selected from said group consisting of magnetic microparticles and magnetic nanoparticles, wherein said particles agglomerate into said microstructures, and wherein said microstructures are arranged in response to an attractive magnetophoretic force exerted by a magnetic-field gradient on a surface of said master substrate.

2. The method of claim 1, further comprising depositing a layer on said magnetically-structured face, wherein depositing said layer occurs before applying said particles, and wherein depositing said layer facilitates subsequent peeling of film from said master substrate.

3. The method of claim 1, further comprising agitating said master substrate after having applied said particles.

4. The method of claim 1, further comprising applying a gas jet to said master substrate, wherein applying said gas jet occurs before providing said non-magnetic matrix, and wherein applying said gas jet comprises applying said gas jet in a manner that results in at least one of optimizing a distribution of said particles in relation to said micro-sources and eliminating particles not trapped by a magnetic field of said master substrate.

5. The method of claim 1, further comprising depositing a liquid-phase ligand on said micro-structures in such a way as to reinforce mechanical cohesion of said particles that form said microstructures, wherein depositing said liquid-phase ligand is carried out prior to providing said non-magnetic matrix on said magnetically-structured face and on said magnetic microstructures.

6. The method of claim 1, further comprising, after having peeled said film, depositing an electrically conducting material on at least a part of a surface of said film.

7. The method of claim 1, further comprising winding said film to form a tube.

8. The method of claim 1, wherein said matrix comprises thermoplastic material, wherein said method further comprises shaping said matrix against a mold by thermoforming, and wherein shaping said matrix occurs after having peeled said film.

9. The method of claim 1, further comprising, after having provided said matrix on said magnetically-structured face of said master substrate and on said microstructures, allowing said matrix to at least one of harden and reticulate.

10. The method of claim 1, wherein providing said matrix comprises pouring said matrix on said magnetically-structured face and on said microstructures.

11. The method of claim 1, further comprising providing said matrix in fluid form, wherein providing said matrix comprises pouring said matrix on said magnetically-structured face and on said microstructures and spreading said matrix, which is in fluid form, over said magnetically-structured face.

12. The method of claim 1, wherein providing said matrix comprises spin-coating said matrix, which is in fluid form, over said magnetically-structured face.

13. An article of manufacture comprising a use for the film recited in claim 1, said article of manufacture comprising first and second films assembled together, wherein said first film comprises a cavity, wherein said second film is assembled with said first film to close said cavity and to form a microfluidic channel, and wherein at least one of said first and second films comprises said film.

14. The article of manufacture of claim 13, wherein said microfluidic channel comprises magnetically-structured walls as a result of said first and second films each having a magnetically-structured surface.

15. The method of claim 1, further comprising selecting a material from which said matrix is to be made, wherein said material is selected from the group consisting of an elastomer, a thermosetting material, a metal, carbon, an oxide, polydimethylsiloxane, rubber, methyl polymethacrylate, parylene, polystyrene, polyester, epoxy resin, thermosetting phenol formaldehyde resin, a photosensitive resin, $SiO_2$, $Al_2O_3$, $HfO_2$, a metal, a carbon material, copper, silver, graphite, and diamond-like carbon.

16. The method of claim 1, wherein said magnetically-structured face of said master substrate has at least one cavity and/or at least one projection, in such a way that, after the peeling, the film has a projection and/or a cavity respectively complementary to the cavity and/or projection of the master substrate.

17. The method of claim 1, further comprising applying an external magnetic-field to said film in such a way as to magnetize said three-dimensional magnetic microstructures enclosed in said matrix, thereby forming a magnetic device comprising a plurality of micro-magnets.

18. An apparatus for using the film recited in claim 1, said apparatus comprising a conveyor belt for passage of powder from which magnetic particles are to be recovered, said conveyor belt having a surface that is in contact with said powder, wherein at least a part of said surface comprises said film, wherein said film comprises a non-magnetic matrix and a plurality of three-dimensional magnetic microstructures arranged within said matrix according to a predetermined pattern, said microstructures being formed from an agglomerate of magnetic microparticles or nanoparticles.

* * * * *